United States Patent [19]

Hsu

[11] Patent Number: 5,408,988

[45] Date of Patent: Apr. 25, 1995

[54] SOLDERING TOOL

[76] Inventor: David Hsu, 1F, 125-4, Section 3, Roosevelt Rd., Taipei, Taiwan, Prov. of China

[21] Appl. No.: 95,963

[22] Filed: Jul. 22, 1993

[51] Int. Cl.⁶ .............................................. B23K 3/02
[52] U.S. Cl. ..................................... 126/414; 126/413; 431/345; 431/328
[58] Field of Search ..................... 431/345, 328, 354; 126/413, 414, 401, 236, 239, 402, 403, 406, 407, 408, 409, 411, 412

[56] References Cited

U.S. PATENT DOCUMENTS

| 4,858,593 | 8/1989 | Hsu | 126/414 |
| 5,007,405 | 4/1991 | Hsu | 126/413 X |
| 5,083,916 | 1/1992 | Glennon et al. | 126/414 X |
| 5,135,389 | 8/1992 | Dai et al. | 126/413 X |
| 5,215,076 | 6/1993 | Oglesby et al. | 126/413 |

Primary Examiner—Larry Jones

[57] ABSTRACT

A soldering tool has a tip including a dispersing cylinder contained therein to disperse a gas stream and has a plurality of cooling fins at two sides of intermediate tubes. A hollow mixing tube has a needle hole disk surrounded by a plurality of air orifices to communicate with the inside, and a rotatable knurled knob for adjusting gas flow. A circular valve seal, made of elastic material has a radial shallow slot and a hollow valve seat body that is connected to a gas tank via a flexible tube.

12 Claims, 3 Drawing Sheets

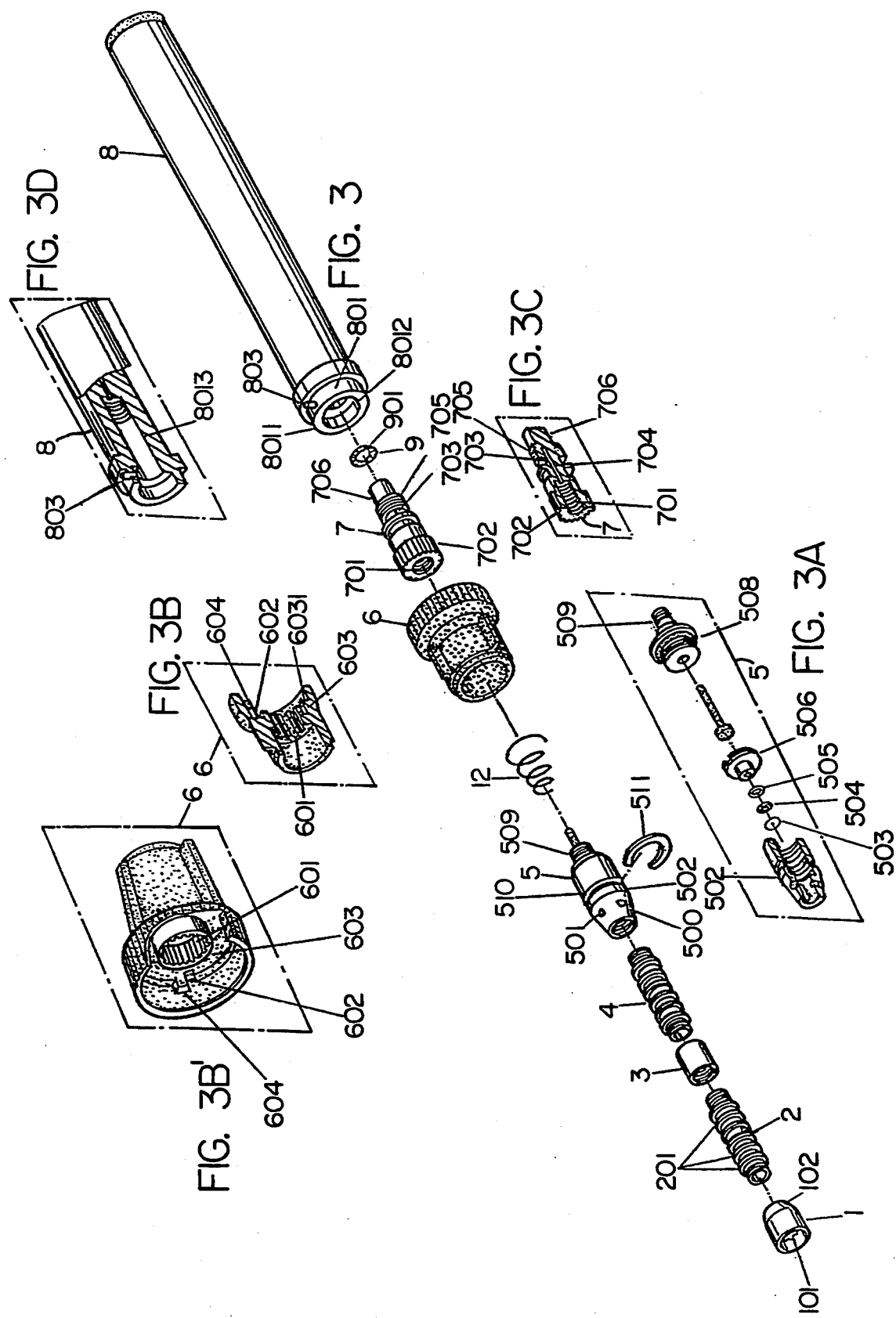

SOLDERING TOOL

FIELD OF INVENTION

This invention relates to a soldering tool, particularly the one having a valve assembly and thermal radiating structure, which is connected to a propane tank.

BACKGROUND OF THE INVENTION

It is found that a soldering tool using gases as fuel has been widely used, for instance, heating painted surfaces to affect scraping, and by thermal expansion of PVC to facilitate the engagement of pipe joints, to loosen nuts from bolts. Though conventional devices (including two U.S. Pat. Nos. 5,007,405 and No. 4,858,593 granted to the same inventor) can be applied, the structure thereof still has room for improvement, for example, improving the air intake and the cooling of the combustion tip to reduce the possibility of injury by heat, and prevent the soldering tool from becoming opened and raise the working performance. Thus the function of this soldering tool will be an improvement over present arts.

SUMMARY OF THE INVENTION

Thus the main object of this invention is to provide a smaller valve assembly using propane as fuel. It can prevent the gas valve from accidental opening, and to ensure the safety in application.

Another object of this invention is to provide a flexible tube to be connected with the gas soldering tool and propane source, so that the soldering tool can be operated along any direction and prevent a back flow of liquid propane into the soldering tool, which may result in losing control of the flame.

A further object of this case is to provide an intermediate tube to connect two cooling fins. Therefore, the rate of heat transfer from the combustion tip can be retarded and prevent the operator from being hurt.

A further object of this case is to provide an elastic valve seal and a radial shallow slot. The flow rate of propane is determined by the variation of the slot, besides, it can also be used as a sealing ring, thus the structure of the valve is greatly simplified.

The efficacy and other objects of this invention will become more clear together with the explanation of the following drawings.

BRIEF DESCRIPTION OF THE DRAWINGS

FIGS. 3, and 3A-3D are exploded views of the elements of FIG. 1 in corresponding positions, wherein some of the elements are also shown in a cut-away view.

DETAILED DESCRIPTION OF A PREFERRED EMBODIMENT

Figure 2:
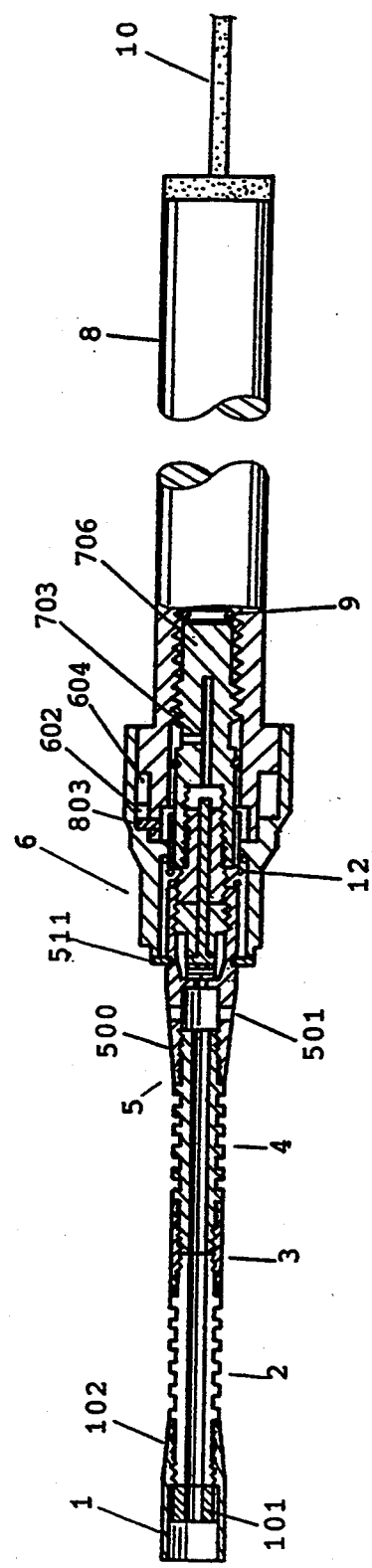
FIG. 2 is a sectional view of FIG. 1.

Referring to FIGS. 2 and 3, the invention comprises tip 1, first cooling fin 2, intermediate tube 3, second cooling fin 4, mixing tube 5, rotatable knurled knob 6, valve stem 7, valve body 8, valve seal 9, and flexible tube 10. Tip 1 is a hollow cylinder, wherein a dispersing cylinder 101 is contained. In cylinder 101, a plurality of axial slots are provided, when being inserted into tip 1, together with the inner wall of tip 1, a plurality of passages are formed thereby, so that propane can be dispersed and burned. In addition, another end of tip 1 has a sloping surface 102. Cooling fin 2 is a hollow tube, and two ends are provided with male threads to engage with female threads of tip 1. Besides, the outward surface of cooling fin 2 is provided with a plurality of cooling fins 201. The material of intermediate tube 3 is different from the first cooling fin 1 and usually possesses lower thermal coefficient, for instance stainless material, and the two ends thereof are provided with female threads to respectively engage with first cooling fin 2 leftward and second cooling fin 4 rightward. Cooling fins 4 and 2 have identical structures. The right end of second cooling fin 4 is threaded with left end of mixing tube 5. A sloping surface 500 is formed at the outward surface of the left end of mixing tube 5, wherein a plurality of radial orifices 501 communicate with the hollow inside of the tube. Refer to FIG. 3A, a shoulder portion 502 is formed therein to position a needle hole disk 503, filter 504 and positioning ring 505. Besides, a hollow positioning stem 506 is threaded in to press these elements, and a plug 508 is threaded to seal the right end of mixing tube 5, and a stem 509 having a hollow passage and protruding therefrom is provided for communication. The right end of mixing tube 5 is inserted into knurled knob 6.

Refer to FIG. 3B and 3B' which shows the opposite view of FIG. 3B, in knurled knob 6, a slotted hole 601 is provided, and an inner ring 603 with a notch 602 is provided, whereon a sliding surface 6031 is formed; in addition, stop 604 protrudes from the sliding surface 6031, and the functions thereof will be described later.

Refer to FIG. 3D, Valve stem 7 has an internal threaded hole 701 which mates with the threaded stem 509 at the end of plug 508, whereon slots 702 are formed on the outer periphery to mate with slotted hole 601 inside knurled knob 6 and can be moved axially. At the central portion of valve stem 7, a radial orifice 703 is provided to communicate with passage 704 along the axial direction. Besides, threaded portion 705 is formed at the outward surface thereof, and a stem 706 extends therefrom.

In FIG. 3C, a rim 801 is formed at the left end of valve seat body 8, and the outer diameter 8011 is slightly smaller than the inner diameter of inner ring 603, and the inner diameter 8012 thereof is slightly larger than the outside diameter of another end of slotted hole 601, so that it can be inserted into the space between inner ring 603 and slotted hole 601. Besides, a radial pin 803 is erected at the outward surface of rim 801. When rim 801 is inserted into knurled knob 6, the pin 803 rests in the notch 602.

Refer to FIG. 3D, valve seat body 8 is provided with inner threaded hole 8013 having a smaller diameter, and a valve seal 9 sits at the bottom of the threaded hole. Valve seal 9 is made of circular elastic material and has a radial shallow slot 901. Internal threads 8013 mate with threaded portion 705 on valve assembly 7, so that stem 706 can press valve seal 9.

Figure 1:
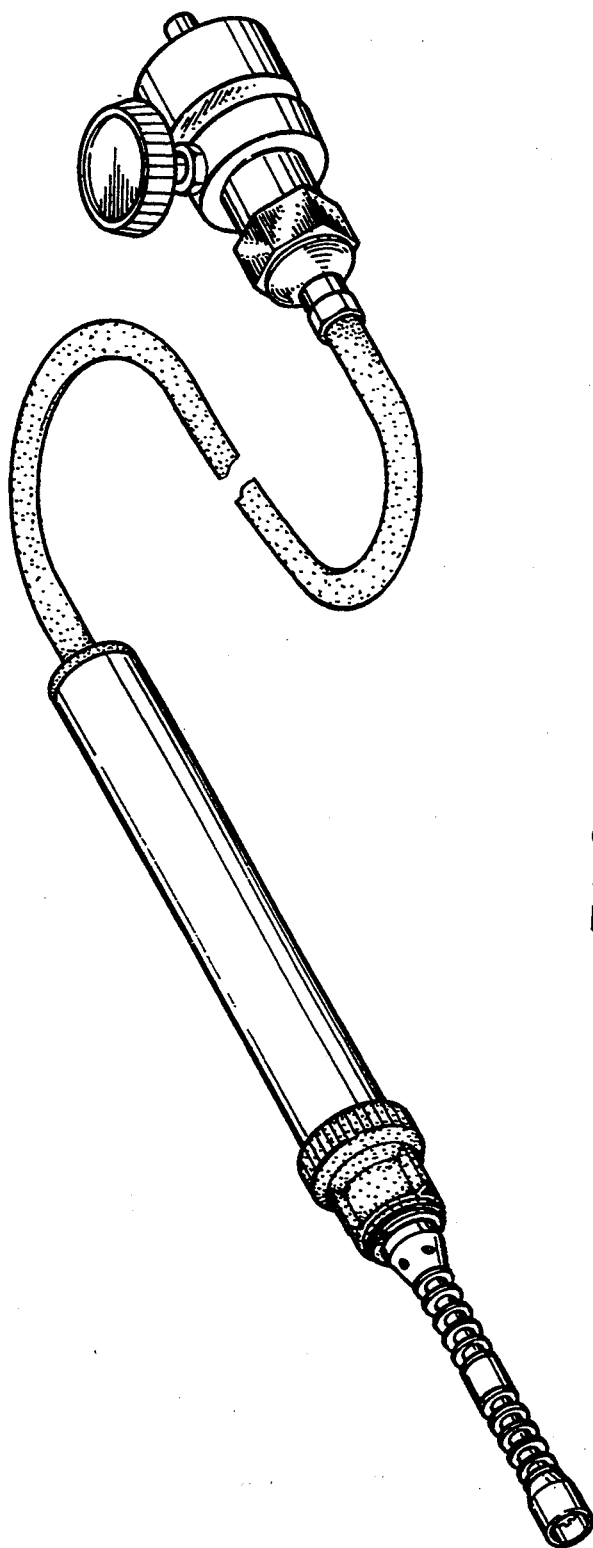
FIG. 1 is a perspective view of the invention.

Finally, as shown in FIGS. 1 and 2, a flexible tube 10 is connected with the tail of valve seat body 8, and the proximal end of the flexible tube is connected with valve 11 to be threaded with a propane tank (not shown).

The operation of the invention will be described as follows:

before valve 11 (in FIG. 1) is turned open, propane gas has not yet flown to the tip during the closed condition. The operator removes the safety clip 511 which presses against the top of rotatable knurled knob 6 and is clipped in the circular slot 510 of the mixing tube 5. Thus, knurled knob 6 is pushed leftward by anti-spring 12, so that notch 602 separates from the radial pin 803 resting therein. Then rotatable knurled knob 6 is turned counter-clockwise (viewed from the tip) a certain angle, and valve assembly 7 engaging with knurled knob 6 follows and is raised, so that stem 706 releases valve seal 9 for a certain level.

Thus, radial slot 901 on valve seal 9, which is always under flat state, can be restored elastically to an open state, so that propane gas of high pressure can flow through the slot rapidly, and through radial orifice 703, passage 704, hollow stem 509, the needle hole disk 503 and into mixing tube 5. Due to the flowing of propane gas, the air out of the mixing tube 5 is sucked from ventilating orifice 501 and mixes with the propane, then proceeds through the second cooling fin unit 4, intermediate tube 3, first cooling fin unit 2, tip 1 finally, and is dispersed by the slots in cylinder 101. Now, it is ignited at tip 1 to burn the propane. The operator can further rotate knurled knob 6 counter-clockwise to raise valve assembly 7 from valve seat body 8, then the radial slot 901 of valve seal 9 is enlarged, thus the flow rate of propane can be adjusted to a desired size of flame. Finally, a gap is formed between valve stem and valve seal. The stop 604 on rotatable knurled knob 6 is stopped by pin 803 and now can no longer be rotated and maximum opening is achieved. On the contrary, if the operator wants to reduce or close the flame, he rotates knurled knob 6 clockwise so that valve stem 7 presses valve seal 9, and the recessed notch 602 in knurled knob 6 can be directed and receive pin 803. Now safety clip 511 is now inserted into circular slot 510 to lock knurled knob 6 and prevent it from accidental turning.

When propane is burned at tip 1, the heat of combustion tip 1 under high temperature is transferred to the first cooling fin 2, intermediate tube 3 and the second cooling fin 4. Since the thermal coefficient of intermediate tube 3 is less than that of the first cooling tube 1, thus it can prevent over-heating of the second cooling fin 4 and accordingly prevent the operator from being hurt.

Besides, in this invention, since the soldering tool is connected with a propane tank via a flexible tube 10, the soldering tool can reach any welding site as the operator wishes. Accordingly, the structure of conventional soldering tools with small size, wherein the soldering tool and a fuel tank are usually connected together, is improved. Besides, any direction of soldering can be achieved by utilizing the soldering tool of this invention.

Though propane is described as the fuel source heretofore, other proper liquidized natural gases can also be used. After being numerously tested, it is found that this invention can achieve the pre-determined objects and efficacy, and accordingly is really a practical creation.

It is understood by those skilled in the art that this invention should not be construed as restricted to the above described embodiment and that various changes and modifications may be made in the invention without departing from the gist and scope thereof.

Other objects and advantages of the present invention will become apparent from the detailed description above taken in conjunction with the appended claims.

What is claimed is:

1. A soldering tool, comprising:

a tip (1), wherein a dispersing cylinder (101) is contained to disperse gas stream;

a plurality of cooling fins (2,4) connected by intermediate tubes (3), and one end the first cooling fin (2) is connected with said tip (1);

a hollow mixing tube (5), one end is connected with one end of the last cooling fin (4), and the outside surface near this end is provided with a plurality of air orifices (501) to communicate with inside, wherein a needle hole disk (503) is provided, and a plug (506) is threaded to seal the right end of the mixing tube (5), and a hollow passage (509) is provided in the plug (508) for communication.

a rotatable knurled knob (6), wherein a slotted hole (601) is provided, and an concentric inner ring (603) with a notch (602) is provided, whereon a sliding surface (6031) is formed, besides, a stop (604) protrudes from the sliding surface (6031), and one end of the mixing tube (5) penetrates a spring (12) and the knurled knob (6);

a valve assembly (7), having an internal threaded hole (701) to mate with the threaded stem (509) of valve assembly (5), whereon slots (702) are formed on the outer periphery to mate with the slotted hole (601) inside the knurled knob (6), the valve assembly (7) can be moved axially, at the central portion thereof, a radial orifice (703) is provided to communicate with an axial passage (704), threaded portion (705) is formed at the outward surface thereof, and a stem (706) extends therefrom;

a circular valve seal (9), made of elastic material and has a radial shallow slot (901);

a hollow valve seat body (8), wherein a rim (801) formed at the left end to mate with the space between inner ring (603) and slotted hole (601); and a radial pin (803) erecting from the rim (801) normally rests in the notch (602) of inner ring (603); at proper depth, an inner threaded hole 8013 with a smaller diameter is provided therein to mate with the threaded portion (705) of valve assembly (7) and a valve seal (9) provided at the bottom of the threaded hole 8013 is pressed by valve stem (706).

2. A soldering tool as claimed in claim 1, wherein the tip (1) has a sloping surface (102), converging toward the first cooling fin (2), and the mixing tube (5) has a diverging surface (500), wherein the radial orifices (501) are provided on the diverging surface.

3. A soldering tool as claimed in claim 2, wherein a circular slot (510) is provided on the outward surface of the mixing tube (5), and a safety clip (511) can be inserted therein to lock the knurled knob (6) from axial moving due to accidental turning.

4. A soldering tool as claimed in claim 2, wherein the tail end of the valve seat body (8) is connected with a gas tank via a flexible tube (10).

5. A soldering tool as claimed in claim 1, wherein a circular slot (510) is provided on the outward surface of the mixing tube (5), and a safety clip (511) can be inserted therein to lock the knurled knob (6) from axial moving due to accidental turning.

6. A soldering tool as claimed in claim 1, wherein the tail end of the valve seat body (8) is connected with a gas tank via a flexible tube (10).

7. A soldering tool as claimed in claim 6, wherein one end of valve seat body (8) is connected with a gas tank via a flexible tube (10).

8. A soldering tool as claimed in claim 1, wherein the needle hole disk (503) is positioned and secured by a hollow stem (506).

9. A soldering tool as claimed in claim 1, wherein the cooling fins are made of copper and the intermediate tubes are made from stainless alloy.

10. A soldering tool comprising:
a tip (1), wherein a dispersing cylinder (101) is contained to disperse gas stream;
a plurality of cooling fins (2,4) connected by intermediate tubes (3), and one end the first cooling fin (2) is connected with said tip (1);
a hollow mixing tube (5), one end is connected with one end of the last cooling fin (4), and the outside surface near this end is provided with a plurality of air orifices (501) to communicate with inside, wherein a needle hole disk (503) is provided, and a plug (506) is threaded to seal the right end of the mixing tube (5), and a hollow passage (509) is provided in the plug (508) for communication;
a rotatable knurled knob (6), wherein a slotted hole (601) is provided, and an concentric inner ring (603) with a notch (602) is provided, whereon a sliding surface (6031) is formed, besides, a stop (604) protrudes from the sliding surface (6031), and one end of the mixing tube (5) penetrates a spring (12) and the knurled knob (6);
a valve assembly (7), having an internal threaded hole (701) to mate with the threaded stem (509) of valve assembly (5), whereon slots (702) are formed on the outer periphery to mate with the slotted hole (601) inside the knurled knob (6), the valve assembly (7) can be moved axially, at the central portion thereof, a radial orifice (703) is provided to communicate with an axial passage (704), threaded portion (705) is formed at the outward surface thereof, and a stem (706) extends therefrom;
a circular valve seal (9), made of elastic material and has a radial shallow slot (901);
a hollow valve seat body (8), wherein a rim (801) formed at the left end to mate with the space between inner ring (603) and slotted hole (601); and a radial pin (803) erecting from the rim (801) normally rests in the notch (602) of inner ring (603); at proper depth, an inner threaded hole 8013 with a smaller diameter provided therein to mate with the threaded portion (705) of valve assembly (7) and a valve seal (9) provided at the bottom of the threaded hole 8013 is pressed by valve stem (706) wherein a circular slot (510) is provided on the outward surface of the mixing tube (5), and a safety clip (511) can be inserted therein to lock the knurled knob (6) from axial moving due to accidental turning.

11. A soldering tool comprising:
a tip (1), wherein a dispersing cylinder (101) is contained to disperse gas stream;
a plurality of cooling fins (2,4) connected by intermediate tubes (3), and one end the first cooling fin (2) is connected with said tip (1);
a hollow mixing tube (5), one end is connected with one end of the last cooling fin (4), and the outside surface near this end is provided with a plurality of air orifices (501) to communicate with inside, wherein a needle hole disk (503) is provided, and a plug (506) is threaded to seal the right end of the mixing tube (5), and a hollow passage (509) is provided in the plug (508) for communication;
a rotatable knurled knob (6), wherein a slotted hole (601) is provided, and an concentric inner ring (603) with a notch (602) is provided, whereon a sliding surface (6031) is formed, besides, a stop (604) protrudes from the sliding surface (6031), and one end of the mixing tube (5) penetrates a spring (12) and the knurled knob (6);
a valve assembly (7), having an internal threaded hole (701) to mate with the threaded stem (509) of valve assembly (5), whereon slots (702) are formed on the outer periphery to mate with the slotted hole (601) inside the knurled knob (6), the valve assembly (7) can be moved axially, at the central portion thereof, a radial orifice (703) is provided to communicate with an axial passage (704), threaded portion (705) is formed at the outward surface thereof, and a stem (706) extends therefrom;
a circular valve seal (9), made of elastic material and has a radial shallow slot (901);
a hollow valve seat body (8), wherein a rim (801) formed at the left end to mate with the space between inner ring (603) and slotted hole (601); and a radial pin (803) erecting from the rim (801) normally rests in the notch (602) of inner ring (603); at proper depth, an inner threaded hole 8013 with a smaller diameter provided therein to mate with the threaded portion (705) of valve assembly (7) and a valve seal (9) provided at the bottom of the threaded hole 8013 is pressed by valve stem (706) wherein the needle hole disk (503) is positioned and secured by a hollow stem (506).

12. A soldering tool comprising:
a tip (1), wherein a dispersing cylinder (101) is contained to disperse gas stream;
a plurality of cooling fins (2,4) connected by intermediate tubes (3), and one end the first cooling fin (2) is connected with said tip (1);
a hollow mixing tube (5), one end is connected with one end of the last cooling fin (4), and the outside surface near this end is provided with a plurality of air orifices (501) to communicate with inside, wherein a needle hole disk (503) is provided, and a plug (506) is threaded to seal the right end of the mixing tube (5), and a hollow passage (509) is provided in the plug (508) for communication;
a rotatable knurled knob (6), wherein a slotted hole (601) is provided, and an concentric inner ring (603) with a notch (602) is provided, whereon a sliding surface (6031) is formed, besides, a stop (604) protrudes from the sliding surface (6031), and one end of the mixing tube (5) penetrates a spring (12) and the knurled knob (6);
a valve assembly (7), having an internal threaded hole (701) to mate with the threaded stem (509) of valve assembly (5), whereon slots (702) are formed on the outer periphery to mate with the slotted hole (601) inside the knurled knob (6), the valve assembly (7) can be moved axially, at the central portion thereof, a radial orifice (703) is provided to communicate with an axial passage (704), threaded portion (705) is formed at the outward surface thereof, and a stem (706) extends therefrom;
a circular valve seal (9), made of elastic material and has a radial shallow slot (901);
a hollow valve seat body (8), wherein a rim (801) formed at the left end to mate with the space between inner ring (603) and slotted hole (601); and a radial pin (803) erecting from the rim (801) normally rests in the notch (602) of inner ring (603); at proper depth, an inner threaded hole 8013 with a smaller diameter provided therein to mate with the threaded portion (705) of valve assembly (7) and a valve seal (9) provided at the bottom of the threaded hole 8013 is pressed by valve stem (706)

wherein a circular slot (510) is provided on the outward surface of the mixing tube (5), and a safety clip (511) can be inserted therein to lock the knurled knob (6) from axial moving due to accidental turning.

* * * * *